United States Patent
Dyner

(10) Patent No.: US 6,857,746 B2
(45) Date of Patent: Feb. 22, 2005

(54) METHOD AND SYSTEM FOR FREE-SPACE IMAGING DISPLAY AND INTERFACE

(75) Inventor: Chad D. Dyner, Hermosa Beach, CA (US)

(73) Assignee: IO2 Technology, LLC, Wilmington, DE (US)

( * ) Notice: Subject to any disclaimer, the term of this patent is extended or adjusted under 35 U.S.C. 154(b) by 0 days.

(21) Appl. No.: 10/430,977

(22) Filed: May 7, 2003

(65) Prior Publication Data

US 2004/0001182 A1 Jan. 1, 2004

Related U.S. Application Data

(60) Provisional application No. 60/392,856, filed on Jul. 1, 2002.

(51) Int. Cl.⁷ .......................... G03B 21/26; G03B 21/00; G03B 21/56; G03B 15/04; G03B 1/14; B05B 15/04; B03B 1/14

(52) U.S. Cl. .......................... 353/28; 353/62; 353/122; 359/443; 359/460; 239/18; 239/20; 239/275; 239/522; 239/590.5

(58) Field of Search .......................... 353/28, 62, 122; 359/443, 460; 239/16, 18, 20, 275, 519, 523, 524, 522, 590.5

(56) References Cited

U.S. PATENT DOCUMENTS

| | | | |
|---|---|---|---|
| 620,592 A | 3/1899 | Just | 353/122 |
| 3,334,816 A | 8/1967 | Mizuno | 239/18 |
| 3,901,443 A | 8/1975 | Mitsui et al. | 239/102.2 |
| 4,974,779 A | 12/1990 | Araki et al. | 239/18 |
| 5,012,485 A | 4/1991 | Ohmori | 372/108 |
| 5,067,653 A | 11/1991 | Araki et al. | 239/18 |
| 5,095,386 A | 3/1992 | Scheibengraber | 359/668 |
| 5,168,531 A | 12/1992 | Sigel | 382/291 |
| 5,270,752 A | 12/1993 | Kataoka et al. | 353/28 |
| 5,311,335 A | 5/1994 | Crabtree | 359/22 |
| 5,445,322 A | 8/1995 | Formhals et al. | 239/18 |
| 5,553,459 A | 9/1996 | Harrison | 62/93 |
| 5,669,221 A | 9/1997 | LeBleu et al. | 62/92 |
| 5,767,842 A | 6/1998 | Korth | 345/168 |
| 5,989,128 A | 11/1999 | Baker et al. | 472/65 |
| 6,058,718 A | 5/2000 | Forsberg et al. | 62/125 |
| 6,076,931 A | 6/2000 | Bone et al. | 353/100 |
| 6,195,069 B1 | 2/2001 | Rhoads | 345/6 |
| 6,243,054 B1 | 6/2001 | DeLuca | 345/7 |
| 6,300,986 B1 | 10/2001 | Travis | 349/5 |
| 6,329,987 B1 | 12/2001 | Gottfried et al. | 345/419 |
| 2004/0046747 A1 * | 3/2004 | Bustamante | 345/173 |
| 2004/0080820 A1 * | 4/2004 | Palovuori et al. | 359/443 |

FOREIGN PATENT DOCUMENTS

WO    WO 02/056111 A1    7/2002

OTHER PUBLICATIONS

Rakkolainen et al—"WAVE—A Walk–thru Virtual Environment" paper.

* cited by examiner

Primary Examiner—Judy Nguyen
Assistant Examiner—Rochelle Blackman
(74) Attorney, Agent, or Firm—Sanford Astor

(57) ABSTRACT

This invention comprises a method and system for displaying free-space, full color, high-resolution video or still images while simultaneously enabling the user to have real-time direct interaction with the visual images. The system comprises a self-generating means for creating a dynamic, non-solid particle cloud by ejecting atomized condensate present in the surrounding air, in a controlled fashion, into an invisible particle cloud. A projection system consisting of an image generating means and projection optics, projects an image onto the particle cloud. Any physical intrusion, occurring spatially within the image region, is captured by a detection system and the intrusion information is used to enable real-time user interaction in updating the image. This input/output (I/O) interface provides a display and computer link, permitting the user to select, translate and manipulate free-space floating visual information beyond the physical constraints of the device creating the image.

80 Claims, 8 Drawing Sheets

METHOD AND SYSTEM FOR FREE-SPACE IMAGING DISPLAY AND INTERFACE

This invention is described in my U.S. Provisional Application No. 60/392,856 filed on Jul. 1, 2002.

FIELD OF THE INVENTION

This invention relates to augmented reality input/output interfaces involving free-space imaging displays, environments, simulation, and interaction.

BACKGROUND OF THE INVENTION

Current technologies attempt to create the visual perception of a free-floating image through the manipulation of depth cues generated from two-dimensional data employing well-established techniques. A few examples of these include stereoscopic imaging via shutter or polarized glasses, as well as auto-stereoscopic technologies composed of lenticular screens directing light from a conventional display, or real-imaging devices utilizing concave mirror arrangements. All of these technologies suffer convergence and accommodation limitations. This is a function of the original two-dimensional image generating data and its disparity to its perceived spatial location, resulting in user eyestrain and fatigue due to the difficulty of focusing on an image that does not truly exist where it is perceived to occur.

In order to resolve this visual limitation, the image and its perceived location must coincide spatially. A well-established method solving this constraint is by projection onto an invisible surface that inherently possesses a true spatially perceived image location; yet prior art methods rendered poor image fidelity. Projection onto non-solid screens was first suggested in 1899 by Just, in U.S. Pat. No. 620,592, where an image was projected onto a simple water screen known in the art as fog screen projections. Since then, general advancements to image quality have been described depending solely on improving the laminar quality of the screen directly correlating to image quality. As such in prior art, these methodologies limit the crispness, clarity, and spatial image stability solely based on the dynamic properties of the screen, which intrinsically produce a relatively spatially unstable image. Minor screen fluctuations further compound images distortion. Image fidelity was further compromised and image aberrations amplified by the easily discernible screen detracting from the intended objective of free-space imaging. Advancements in this invention allow the device to be self-sustainable, and overcome prior art limitations of image stability and fidelity, improve viewing angles, and incorporate additional interactive capabilities.

One of the main disadvantages found in prior art was the reliance on a supply of screen generating material. These devices depended on either a refillable storage tank for the screen generating material, or the device had to be positioned in or around a large body of water such as a lake in order to operate. This limited the operating time of the device in a closed environment such as in a room required refilling, or a plumbing connection for constant operation. The result severely limited the ease of operation, portability, and placement of the device caused by this dependence. Furthermore, some fog screen projection systems changed the operating environment by over-saturating the surrounding ambient air with particulates, such as humidity or other ejected gases. The constant stream of ejected material created a dangerous environment, capable of short-circuiting electronics as well as producing a potential health hazard of mold build-up in a closed space, such as in a room. The dehumidification process disclosed both in Kataoka's U.S. Pat. No. 5,270,752 and Ismo Rakkolainen's WAVE white paper, was not employed to collect moisture for generating the projection surface screen but rather to increase laminar performance as a separate detached aspirator. The present invention employs condensate extraction method specifically to serve as a self-sustained particle cloud manufacturing and delivery system.

Furthermore in prior art, while the projection surface can be optimized for uniformity, thickness, and planarity by improving laminar performance, the inherent nature of a dynamic system's natural tendency towards turbulence will ultimately affect the overall imaging clarity or crispness and image spatial stability such as image fluttering. These slight changes caused by common fluctuating air currents and other environmental conditions found in most indoor and outdoor environments induce an unstable screen, thereby affecting the image. Prior art attempted to solve these image degradation and stability issues by relying on screen refinements to prevent the transition of laminar to turbulent flow. Kataoka's, U.S. Pat. No. 5,270,752 included improvements to minimize boundary layer friction between the screen and surrounding air by implementing protective air curtains, thereby increasing the ejected distance of the screen size while maintaining a relatively homogeneous laminar thin screen depth and uniform particulate density for a stable image. While a relatively laminar screen can be achieved using existing methodologies, generating a spatially stable and clear image is limited by depending solely on improvements to the screen. Unlike projecting onto a conventional physical screen with a single first reflection surface, the virtual projection screen medium invariably exhibits thickness and consequently any projection imaged is visible throughout the depth of the medium. As such, the image is viewed most clearly when directly in front, on-axis. This is due to the identical image alignment stacked through the depth of the screen is directly behind each other and on-axis with respect to the viewer. While the image is most clearly observed on-axis it suffers a significant viewing limitation on a low particulate (density) screen. In order to generate a highly visible image on an invisible to near-invisible screen required high intensity illumination to compensate for the low transmissivity and reflectivity of the screen cloud. This is caused by viewing directly into the bright projection source due to the high intensity illumination to compensate for a low transmissivity and reflectivity of the screen. While in a high particulate count (high density) particle cloud scenario a lower intensity illumination can compensate for the high reflectivity of the screen, this invariable causes the screen to become visibly distracting as well as require a larger and more powerful system to collect the greater amount of airborne particulates.

Additional advancements described in this invention automatically monitor changing environmental conditions such as humidity and ambient temperature to adjust cloud density, microenvironment and projection parameters in order to minimize the visibility of the particle cloud screen. This invention improves invisibility of the screen and image contrast in the multisource embodiment by projecting multiple beams at the image location to maximize illumination intensity and minimize the individual illumination source intensities.

Prior art also created a limited clear viewing zone of on or near on-axis. The projection source fan angle generates an increasingly off-axis projection towards the edges of the image, fidelity falls off where the front surface of the medium is imaging a slightly offset image throughout the depth of the medium with respect to the viewers line of sight. Since the picture is imaged thru the depth of the screen, the viewer not only sees the intended front surface image as on a conventional screen, but all the unintended illuminated particulates throughout the depth of the screen, resulting in an undefined and blurry image. In this invention, a multisource projection system provides continuous on-axis illumination visually stabilizing the image and minimizing image flutter.

This invention does not suffer from any of these aforementioned limitations, by incorporating a self-sustainability particle cloud manufacturing process, significant advances to imaging projection, advances to the microenvironment improving image fidelity, and include additional interactive capabilities.

SUMMARY OF THE INVENTION

This invention provides a method and apparatus for generating true high-fidelity full color, high-resolution free-space video or still images with interactive capabilities. The composed video or still images are clear, have a wide viewing angle, possess additional user input interactive capabilities and can render discrete images, each viewed from separate locations surrounding the device. All of these attributes are not possible with present augmented reality devices, existing fog screen projections, current displays or disclosed in prior art.

The system comprises a self-generating means for creating a dynamic, invisible or near invisible, non-solid particle cloud, by collecting and subsequentially ejecting condensate present in the surrounding air, in a controlled atomized fashion, into a laminar, semi-laminar or turbulent, particle cloud. A projection system consisting of an image generating means and projection optics, projects an image or images onto said particle cloud. The instant invention projects still images or dynamic images, text or information data onto an invisible to near-invisible particle cloud screen surface. The particle cloud exhibits reflective, refractive and transmissive properties for imaging purposes when a directed energy source illuminates the particle cloud. A projection system comprising single or multiple projection sources illuminate the particle cloud in a controlled manner, in which the particulates or elements of the particle cloud act as a medium where the controlled focus and intersection of light generate a visible three-dimensional spatially addressable free-space illumination where the image is composed.

Furthermore, any physical intrusion, occurring spatially within the particle cloud image region, is captured by a detection system and the intrusion such as a finger movement, enables information or image to be updated and interacted with in real-time. This input/output (I/O) interface provides a novel display and computer interface, permitting the user to select, translate and manipulate free-space floating visual information beyond the physical constraints of the device creating the image. This invention provides a novel augmented reality platform for displaying information coexisting spatially as an overlay within the real physical world. The interactive non-solid free floating characteristics of the image allow the display space to be physically penetrable for efficient concurrent use between physical and 'virtual' activities in multi-tasking scenarios including collaborative environments for military planning, conferencing, and video gaming, as well as presentation displays for advertising and point-of-sales presentations.

The invention comprises significant improvements over existing non-physical screens to display clear images, independent of the pure laminar screen found in the prior art, by functioning with non-laminar, semi-laminar and turbulent particle clouds. Novel advancements to the microenvironment deployment method by means of a multiple stage equalization chamber and baffles generate an even laminar airflow reducing pressure gradients and boundary layer friction between the particle cloud and the surrounding air. Furthermore, the electronic environmental management control (EMC) attenuates particle cloud density by controlling the amount of particulates generated and ejected in conjunction with the particle cloud exit velocity, thereby ensuring an invisible to near-invisible screen. This delicate balance of the particle cloud density and illumination intensity was not possible in the prior art and therefore the cloud was either highly visible or too low of a density to generate a bright image. Further advancements to both an improved projection system improve viewing angle limitations inherent with prior art such as fluttering caused by turbulence within the screen. Furthermore, the invention's self-contained and self-sustaining system is capable of producing a constant stream of cloud particles by condensing moisture from the surrounding air, thereby allowing the system to operate independently without affecting the general operating environment. Furthermore, the invention incorporates interactive capabilities, absent in prior art.

The multiple projection source of this invention has the capacity to produce multi-imaging; were discrete images projected from various sources can each be viewed from different locations. This allows a separate image to be generated and viewed independently from the front and rear of the display, for use as example in video-gaming scenarios, where opposing players observe their separate "points of view" while still being able to observe their opponent through the image. In addition, the multisource projection redundancy mitigates occlusion from occurring, such as in the prior art, where a person standing between the projection source and the screen, blocks the image from being displayed.

By projecting from solely one side, the display can also serve as a one-way privacy display where the image is visible from one side and mostly transparent from the other side, something not possible with conventional displays such as television, plasma or computer CRT's and LCD monitors. Varying the projected illumination intensity and cloud density can further attenuate the image transparency and opacity, a function not possible with existing displays. Furthermore, since the image is not contained within a "physical box" comprising a front, flat physical screen, such as in a conventional display, the image is capable of taking on numerous geometries that are not limited to a flat plane. Furthermore, the dimensions of the image are substantially larger than the dimensions of the device creating the image since the image is not constrained to a physical enclosure such as a convention LCD or CRT. The display can also take on varying geometric shapes, generating particle cloud surfaces other than a flat plane, such as cylindrical or curved surfaces. For these particle cloud types adaptive or corrective optics allow compensate for variable focal distances for the projection.

Applications for this technology are wide-ranging, since the displayed image is non-physical and therefore unobtrusive. Imaged information can be displayed in the center of a room, where people or objects can move through the image, for use in teleconferencing, or can be employed as a 'virtual' heads-up display in a medical operating theater, without interfering with surgery. The system of this invention not only frees up space where a conventional display might be placed, but due to its variable opacity and multi-viewing capability, allows the device to be centered around multiple parties, to freely view, discuss and interact collaboratively with the image and each other. The device can be hung from the ceiling, placed on walls, on the floor, concealed within furniture such as a desk, and project images from all directions, allowing the image can be retracted when not in use. A scaled down version allows portable devices such as PDA's and cell phones to have 'virtual' large displays and interactive interface in a physically small enclosure.

DETAILED DESCRIPTION OF THE INVENTION

Figure 1:
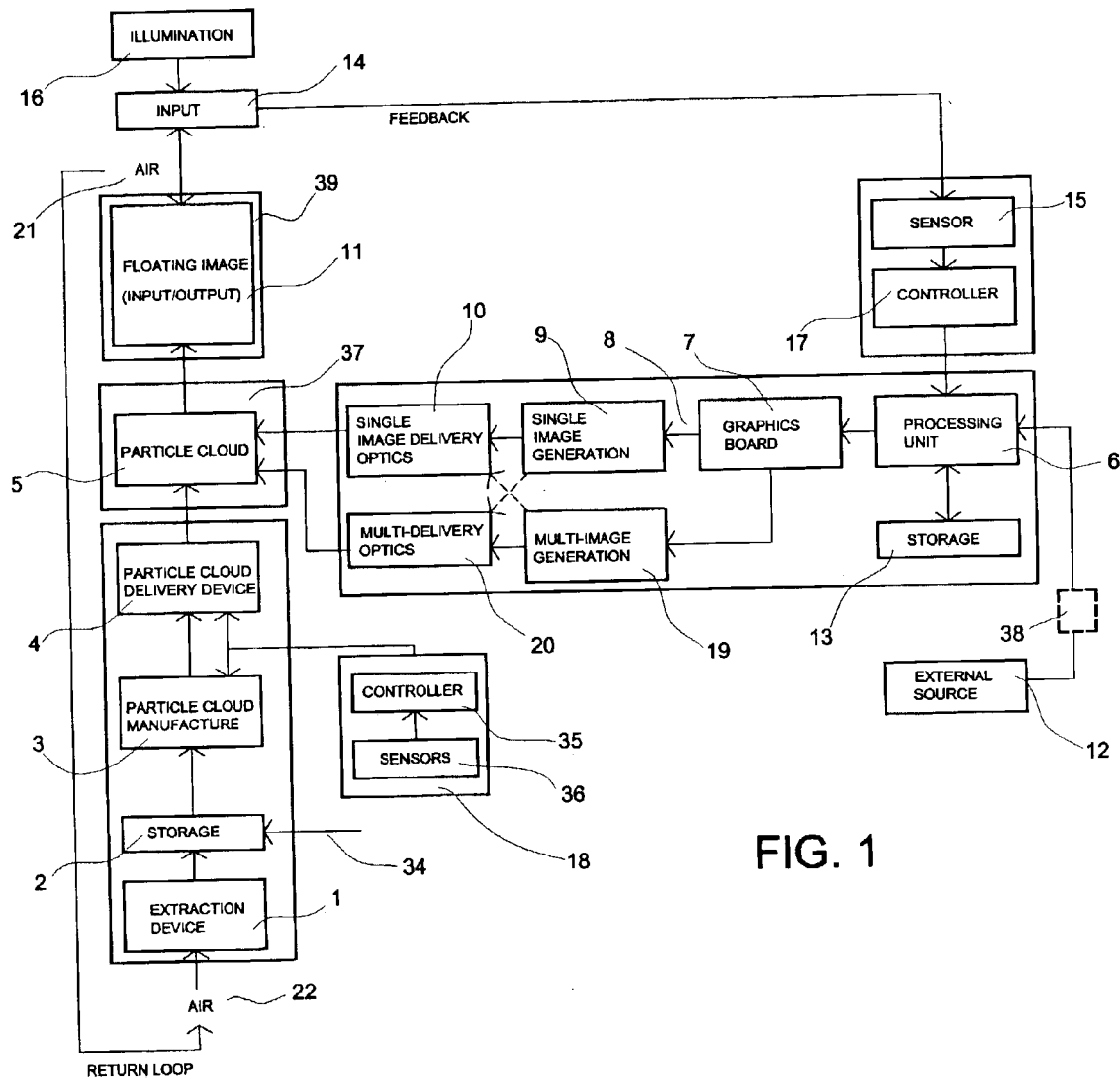
FIG. 1 is a schematic of the main components and processes of the invention.

The basic elements of invention are illustrated in the FIG. 1 schematic. The preferred embodiment of the invention extracts moisture from the surrounding air (22) through a heat pump extraction device (1), utilizing solid-state components such as thermoelectric (TEC) modules, compressor-based dehumidification systems or other means of creating a thermal differential resulting in condensation build-up for subsequent collection. Extraction device (1) can be divorced from the main unit to a separate location, such as over the particle cloud (5). The extracted condensate is stored in a storage vessel (2), which can include an external connection (34), for additional refilling or for operation without extraction device (1). The condensate is sent to a particle cloud manufacturing system (3), described further in the document, which alters the condensate by mechanical, acoustical, electrical or chemical means, or a combination of one or more means, into microscopic particle cloud material (5). Particle cloud delivery device (4) ejects the microscopic particle cloud material locally re-humidifying the surrounding air (21), creating an invisible to near-invisible particle cloud screen (5), contained within a controlled microenvironment (37). EMC system (18) comprising controller (35) and sensor (36) adjusts screen (5) density (number of particulates per defined volume), velocity and other parameters of particle cloud (5). External ambient conditions such as temperature, humidity, and ambient lighting are read by sensors (36), and sent to controller (35), which interpret the data and instruct particle cloud manufacturing system (3) to adjust the parameters, ensuring an effective invisible to near-invisible screen for imaging.

Signals originating from an external source (12), a VCR, DVD, video game, computer or other video source, pass through optional scan converter (38), to processing unit (6), to decode the incoming video signal. Stored video data (13), contained for example on a hard disk, flash memory, optical, or alternate storage means, can be employed as the source of content. The processing unit (6), receives these signals, interprets them and sends instructions to graphics board (7), which generates video signal (8), which is sent to an image generating means (9), producing a still or video image. The image generator (9), comprises a means of displaying still or video data for projection, which may be a liquid crystal display, (LCD), digital light processing unit (DLP), organic light emitting diodes (OLED's) or a laser based means of directing or modulating light from any illumination source used to generate a still or video image. Single image delivery optics (10), comprising telecentric projection optics, may include adaptive anamorphic optics for focusing onto non-linear screens, such as curved surface screens. Components (38, 6, 7, 8, 9, 10) may also be replaced by a video projector in a simplified embodiment. Anamorphic optics and digital keystone correction are also employed to compensate for off-axis projection onto non-parallel surfaces.

In the preferred multisource embodiment, a single projection source (9) includes a multi-delivery optical path (20), comprising a series of lenses, prisms, beamsplitters, mirrors, as well as other optical elements required to split the generated image to "phantom" source locations surrounding the perimeter of the device and redirect the projection beam onto particle cloud (5). In an alternate multi-image generation embodiment, multiple images are generated on either a single image generator, such as one projection unit or a plurality of them (19), and are directed, using a single optical delivery path (10), or multiple delivery paths using multi-delivery optics (20), splitting and recombining the projection. Optical or software based means, well known in the art, or a combination of both means are employed to compensate and correct image focus caused from off-axis projection including image trapezoidal keystone correction for one or more axis (i.e. 4 point keystoning). In all instances, the directed projection illuminates particle cloud (5), where free-space image (11) appears to be floating in protective microenvironment (37) within the surrounding air (21). Microenvironment (37) functions to increase boundary layer performance between the particle cloud and the ambient surrounding air by creating a protective air current of similar ejection velocity to that of particle cloud (5). This microenvironment (37), and particle cloud (5) characteristics can be continuously optimized to compensate for changing environmental conditions, in order to minimize cloud visibility, discussed in further detail below.

In the interactive embodiment, coexisting spatially with image (11) is an input detectable space (39), allowing the image to serve as an input/output (I/O) device. Physical intrusion within the input detectable space (39) of particle cloud (5), such as a user's finger, a stylus or another foreign object, is recognized as an input instruction (14). The input is registered when an illumination source (16), comprised of a specific wavelength, such as infrared (IR) source, is directed towards the detectable space highlighting the intrusion. Illumination comprises a means to reflect light off a physical object within a defined detectable region by utilizing a laser line stripe, IR LED's, or conventional lamp or can include the same illumination source from the image projection illuminating the detectable space. In its preferred embodiment, reflected light scattered off the user's finger or other input means (14) is captured by optical sensor (15). Optical sensor or detector (15) may include a charge-coupled device (CCD), complementary metal-oxide silicon (CMOS) sensor or a similar type of detector or sensor capable of capturing image data.

Sensor (15) is capable of filtering unwanted 'noise' by operating at a limited or optimized sensitivity response similar to or equal to the illumination source (16) wavelength either by employing a specific bandwidth sensor, utilizing band-pass filters or a combination of both. Light beyond the frequency response bandwidth of the sensor is ignored or minimized, diminishing background interference and recognizing only intentional input (14). The coordinate in space where the intrusion is lit by the illumination source corresponds to an analogous two or three-dimensional location within a computer environment, such as in a graphic user interface (GUI) where the intrusion input (14) functions as a mouse cursor, analogous to a virtual touch-screen. The highlighted sensor captured coordinates are sent to controller (17), that read and interpret the highlighted input data using blob recognition or gesture recognition software at processing unit (6), or controller (17). Tracking software coupled for example with mouse emulation software instructs the operating system or application running on processing unit (6) to update the image, accordingly in the GUI. Other detection system variations comprise the use of ultrasonic detection, proximity based detection or radar based detection, all capable of sensing positional and translational information.

In its preferred embodiment, this invention operates solely on a power source independent of a water source by producing its own particle cloud material. By passing the surrounding air through a heat pump, air is cooled and drops below its dew point where condensate can be removed and collected for the cloud material. One method well known in the arts comprises a dehumidification process by which a compressor propels coolant through an evaporator coil for dropping the temperature of the coils or fins and allows moisture in the air to condense while the condenser expels heat. Another variation includes the use of a series of solid-state Peltier TEC modules, such as a sandwich of two ceramic plates with an array of small Bismuth Telluride ($Bi_2Te_3$) "couples" in between, which produce condensation that can be collected on the cold side. Other variations include extracting elements from the ambient air such as nitrogen or oxygen, as well as other gases, to manufacture supercooled gases or liquids by expansion, and as a result, create the thermal gap to generate the condensate cloud material. Another method includes electrochemical energy conversion, such as is employed in fuel cell technology, consisting of two electrodes sandwiched around an electrolyte in which water and electricity are produced. Oxygen passing over one electrode and hydrogen over the other generates electricity to run the device, water for the cloud material and heat as a by-product.

The particle cloud composition consists of a vast number of individual condensate spheres held together by surface tension with a mean diameter in the one to ten micron region, too small to be visible individually by a viewer, yet large enough to provide an illuminated cloud for imaging. The focus and controlled illumination intensity onto the overall cloud, allow the individual spheres to act as lenses, transmitting and focusing light at highest intensity on-axis, whereby the viewer positioned directly in front of both screen and projection source views the image at its brightest and clearest. In the multisource embodiment, the directing of light from multiple sources onto the particle cloud ensures that a clear image is viewable from all around, providing continuous on-axis viewing. The on-axis imaging transmissivity of the cloud screen coupled with the multisource projection insure a clear image, regardless of the viewer's position and compensates for any aberration caused by turbulent breakdown of the cloud. Intersecting light rays from multiple sources further maximize illumination at the intended image location by localizing the sum of illumination from each projection source striking the particle cloud imaging location. In this way, the illumination falloff beyond the particle cloud is minimized onto unintended surfaces beyond, as found in prior art where the majority of the light went through the screen and created a brighter picture on a surface beyond rather than on the intended particle cloud. Similarly, multisource projection further minimizes the individual projection source luminosity allowing the viewer to view directly on-axis without being inundated with a single high intensity projection source, as found in the prior art.

In an alternate embodiment, the particle cloud material can include fluorescence emissive additives or doped solutions, creating an up or down fluorescence conversion with a specific excitation source, utilizing a non-visible illumination source to generate a visible image. Soluble non-toxic additives injected into the cloud stream at any point in the process can include for example Rhodamine, or tracer dyes from Xanthane, each with specific absorption spectra excited by a cathode, laser, visible, (ultra-violet) UV or IR stimulation source. A tri-mixture of red, green and blue visibly emissive dyes, each excited by specific wavelength, generate a visible full spectra image. These additives have low absorption delay times and fluorescence lifetime in the nanosecond to microsecond region, preventing a blurry image from the dynamically moving screen and generating a high fluorescence yield for satisfactory imaging luminosity. An integrated or separate aspirator module collects the additives from the air and prevents these additive dyes from scattering into the surrounding air.

In prior art, lenticular screens have been utilized to selectively direct a predefined image by means of a lens screen so that a particular eye or position of the viewer will render a discrete image. Similarly, when this invention's particle cloud screen is illuminated by an intensity level below where internal refraction and reflection occur within each sphere, producing scattered diffused light rays, the individual particle spheres act as small lenslets performing the similar optical characteristics of lenticular imaging and allow the cloud to perform as a lenticular imaging system. This concept is further explained in FIGS. 2–7.

Figure 2:
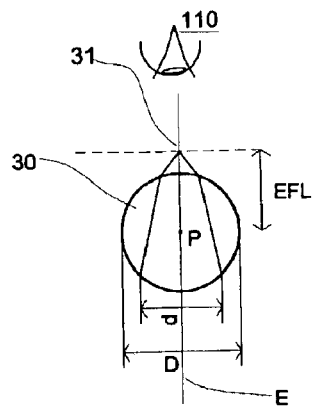
FIG. 2 shows the optical properties of a prior art ball lens, analogous to a single spherical cloud particulate.

FIG. 2 illustrates the optics of an individual cloud particulate, analogous to the optical refractive properties of a ball lens, where D is the diameter of the near perfect sphere of the particulate formed naturally by surface tension. The incoming light follows along path (E), and at resolution (d), is diffracted as it enters sphere (30), and is focused at a distance EFL (effective focal length) at point (31), on-axis (E), from the center of the particulate (P), at maximum intensity on axis (31). This process is repeated on adjacent particulates throughout the depth of the cloud and continues on-axis until finally reaching viewer position (110).

Figure 3:
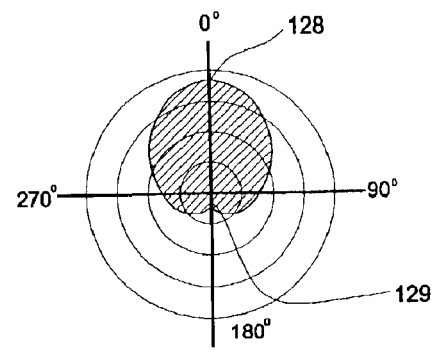
FIG. 3 shows the polar angular illumination intensity of each projection source.

On-axis illumination intensity is determined by source intensity and the depth of the cloud which is represented in polar diagram FIG. 3, where maximum intensity and clarity is in front, on-axis at zero-degrees (128) and lowest behind at 180 degrees, (129). These imaging characteristics occur when illumination intensity is below saturation illumination levels of the particle cloud, that produces omni-directional specular scattering into unintended adjacent particles within the cloud which unnecessarily receive undesired illumination. Therefore, the floating image can be viewed clearly from the front of the screen from a rear-projection arrangement and appear invisible, to near invisible, from behind (129) serving as a privacy one-way screen. The cloud, when viewed from behind, thereby provides an empty surface to project an alternate or reversed image for independent dual image viewing from front or behind, allowing each separate image to be most visible from the opposite end.

Figure 3A:
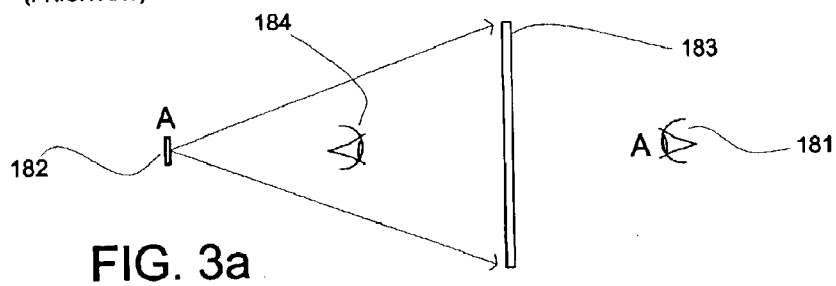
FIG. 3a illustrates the one-sided imaging projection embodiment.
Figure 3B:
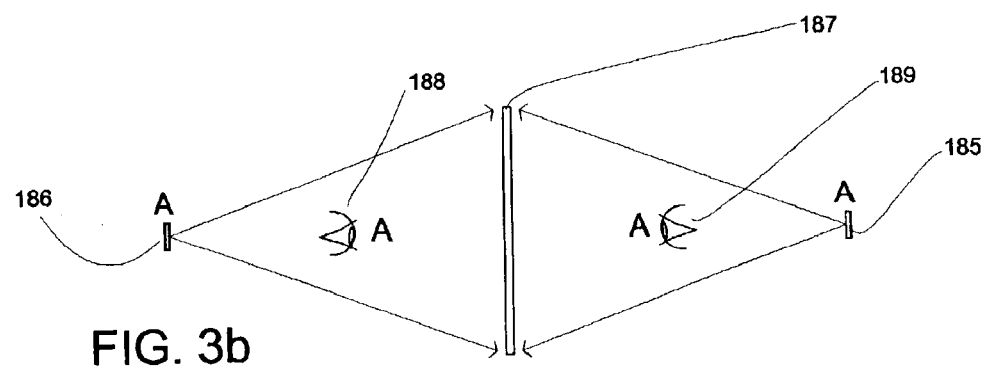
FIG. 3b illustrates the dual-sided concurrent or reversed imaging projection embodiment.
Figure 3C:
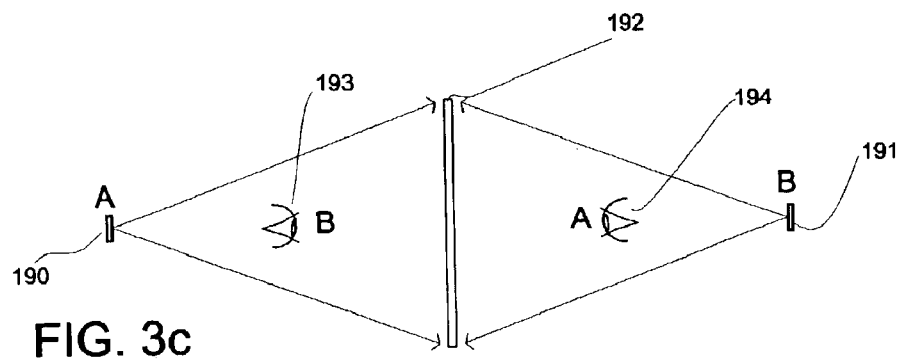
FIG. 3c illustrates dual-sided separate imaging projection embodiment.

FIG. 3a illustrates the one-sided projection embodiment where viewer (181), observes projection image "A" originating from source or sources (182) towards particle cloud (183). Viewer at location (184) cannot observe image "A" or at most, a near-invisible reversed image. FIG. 3b shows image "A" being projected from both sides (185, 186) onto particle cloud (187) where both viewers located at (188, 189) can view image "A". Projection source or sources at either side can reverse the image so that for example text can be read from left-to-right from both sides or the image can correspond so that on one side the image would be reversed. FIG. 3c shows a dual viewing embodiment where projection source or sources (190) project image "A", while projection source or sources (191), project a discrete image "B", both onto particle cloud (192). A viewer located at (193) observes image "B" while observer (194) observes image "A".

Figure 4:
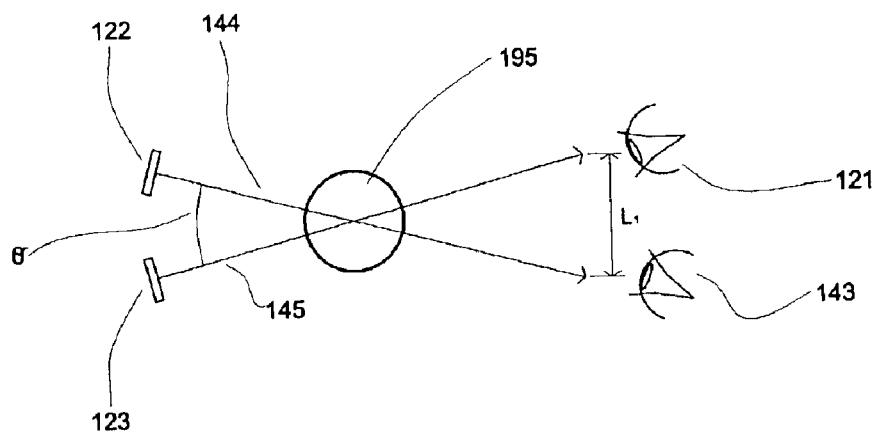
FIG. 4 illustrates the localized optical properties of a single cloud particulate in a multisource projection arrangement.

FIG. 4 illustrates multisource projection at angle theta, (θ) between projection sources (122, 123) and the particulate (195) providing a constant on-axis image irrespective of the viewer's location, thereby ensuring a clear image. For a viewer positioned at (121), projected images following path (145) from projection source (123) are clearly visible, while simultaneously projected image rays (144, 145) originating from projection source (122) being projected at angle theta, generate a sum of the intensity of each source. Discrete stereoscopic images can be projected at angle theta allowing for simulated three-dimensional imaging, when distance $L_1$ is equal or approximates binocular distance between the right and left eye of the user and the falloff of each projection source is great enough so that only the desired projection source is viewable to the desired left or right eye.

Figure 5:
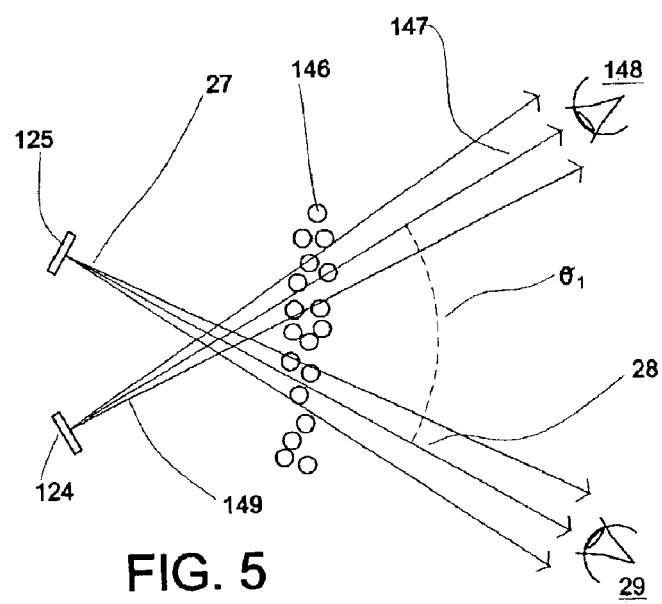
FIG. 5 illustrates the optical multisource principle at a larger scale than presented in FIG. 4.

FIG. 5 illustrates the overall view where the viewer is presented with two images, either identical or discrete, projected from separate source locations. Light ray (149), from the projection source (124) illuminates particle cloud (146), which transmits most of its light on-axis (147) directed to viewer's eye (148). Similarly, a separate or identical image from projection source (125) following light ray (27) illuminates particle cloud (146), viewed on-axis (28), when the viewer's eye (29), is directed into the projection axis (28).

Figure 6:
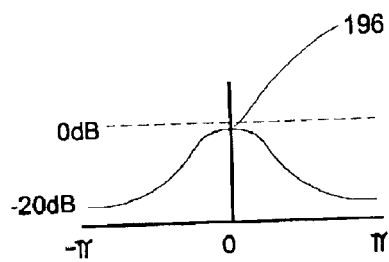
FIG. 6 represents the imaging clarity level of a single projection source.

FIG. 6 represents the angular clarity falloff of a single projection source in a Cartesian coordinate with the maximum intensity and clarity image on-axis at zero degrees (196). The combination of the individual microscopic particulates act as an entire lens array, focusing the majority of light in front of the projection source and on-axis producing this illumination pattern. These inherent optical properties of a particle sphere as well as the particle cloud as a whole insure off-axis illumination intensity fall-off as a controllable means of directing multiple light paths projecting similar or discrete images that can be viewed from specific locations (on or near on-axis to in front of the projection source).

Figure 7:
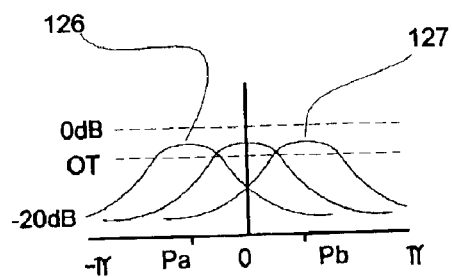
FIG. 7 represents the imaging clarity level from a multisource projection.

FIG. 7 shows an example of a multisource projection with three sources, although an $n^{th}$ number of sources are possible. The three sources are (Pa), on-axis at (0), and source (Pb) with clarity threshold at (OT). The angular threshold angle is the midpoint between Pa and on-axis (0) at (126), as well as the midpoint between on-axis (0), and Pb at (127).

Figure 8:
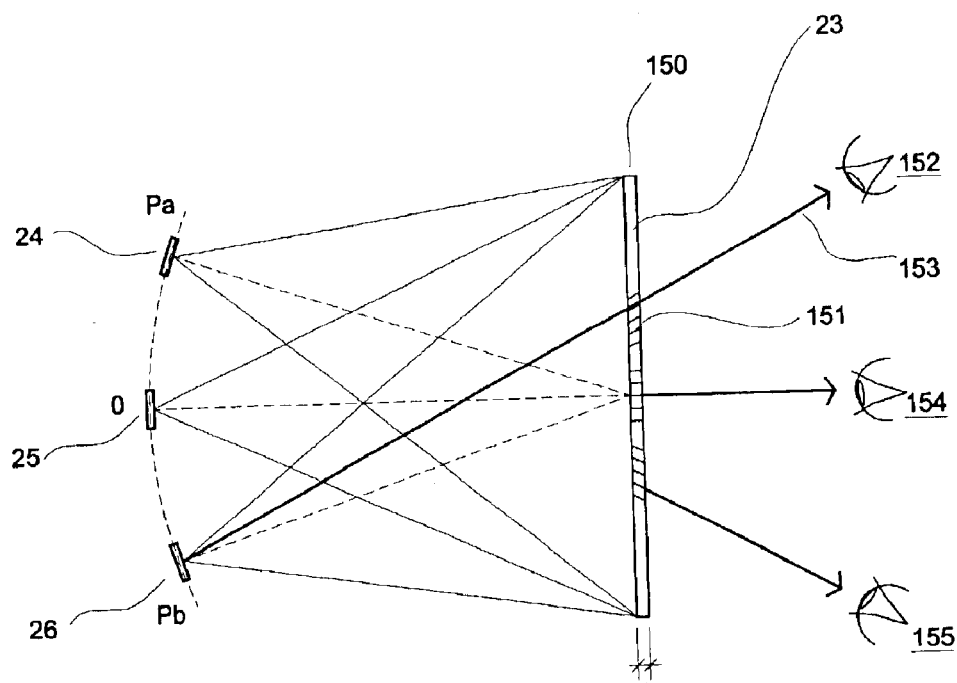
FIG. 8 illustrates the multiple projection source of FIG. 7.

FIG. 8 is a plan view of the invention described in the chart of FIG. 7. Source Pa, shown as (24), on-axis source (0) as (25), and source Pb as (26) project onto surface (23) with depth (150). When viewer (152) looks at particle cloud (23), the projection source (26) illuminates the maximum and clearest illuminated image the viewer sees at this location because pixel depth (151) is parallel to the viewing axis (153). When the viewer moves to location (154), the image the he or she sees is illuminated by on-axis projection source (25) where the image projection is imaged throughout the depth (197) of the particle cloud (150). Similarly, as the viewer moves around particle cloud (150) and when located at position (155), the image viewed originates from source (24). The viewer located at any of these positions or in between will be viewing simultaneously the entire image composed by a plurality of projection sources from which the light rays of each sequentially or simultaneously projected source is directed towards particle cloud (150).

Figure 9:
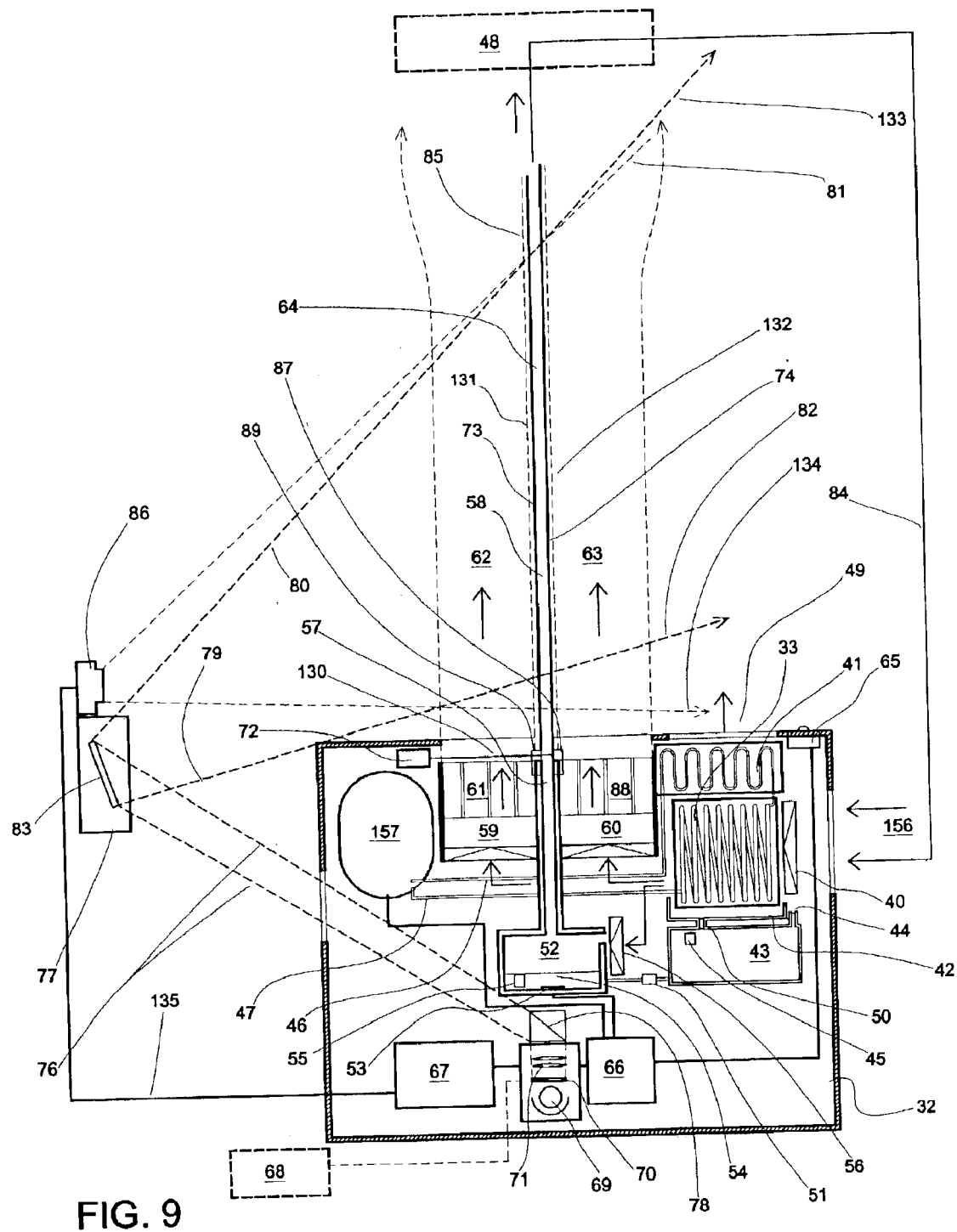
FIG. 9 is a sectional side view of the components of the invention.

FIG. 9 describes in detail the operation of the preferred embodiment of the invention. Surrounding air (156) is drawn into the device (32), by fan or blower (40). This air is passed though a heat exchanger (33, 41), comprising a cold surface such as a thermoelectric cold plate, evaporator fin or coil (33), which can be incorporated or separated as an aspirator (48) located above the particle cloud, serving as a collector. This air subsequentially passes over the hot side of a TEC module heat sink or condenser coil (41), where heat generated is exhausted into the surrounding air (49), or passes through fans (59, 60,) and below to fan (56) so that the exhausted air is of similar temperature. Condensate forming on cold plate, coil or fin (33), drips via gravity or forced air and is collected into pan (42), passes through one-way check valve (50), into storage vessel (43). Alternatively, vessel (43) may allow the device to operate independently, without the use of a heat exchanger, by opening (44) or other attachment, to fill with water or connect to external plumbing. A level sensor, optical or mechanical switch controls the heat exchanger, preventing vessel (43) from overflowing. Compressor (157), pumping freon or other coolant through pipes (46) and (47) can be employed in a conventional dehumidification process well known in the art.

Maximizing condensate is critical as it is a high power demanding process. Increasing airflow and maximizing surface area of the evaporator are essential for ensuring constant operation and minimizing overload on the heat exchanger, TEC's or compressor. In a solid-state TEC embodiment, compressor (45) would be absent and evaporator (33) and condenser (41) would be replaced by the hot and cold sides of a TEC module, with appropriate heat sinks to collect moisture on the cold side and draw heat on the other side. Due to the time lag before condensate formation, vessel (43) allows the device to run for a duration while condensate is formed and collected. The stored condensate travels beyond check valve (51), controlling the appropriate quantity via sensor or switch (55) and enters nebulizing expansion chamber (52) for use in the particle cloud manufacturing process.

In the preferred embodiment, expansion chamber (52) employs electro-mechanical atomizing to vibrate a piezoelectric disk or transducer (53), oscillating ultrasonically and atomizing the condensate, generating a fine cloud mist of microscopic particulates for subsequent deployment. Alternate cloud mist generating techniques can be employed, including thermal foggers, thermal cooling using cryogenics, spray or atomizing nozzles, or additional means of producing a fine mist. The design of the chamber prevents larger particles from leaving expansion chamber (52), while allowing the mist to form within expansion chamber (52). A level sensor (55), such as a mechanical float switch or optical sensor, maintains a specific fluid level within expansion chamber (52) to keep the particulate production regulated. When the fluid surface (54) drops, valve (51) opens, thereby maintaining a predefined depth for optimized nebulization.

Fan or blower (56), injects air into chamber (52), mixing with the mist generated by nebulizer (53), and the air/mist mixture is ejected through center nozzle (57) at a velocity determined by the height required for creating particle cloud (58). Furthermore, nozzle (57) can comprise a tapered geometry so as to prevent fluid buildup at the lip of nozzle (57). Ejection nozzle (57) may have numerous different shapes, such as curved or cylindrical surfaces, to create numerous extruded particle cloud possibilities. Particle cloud (58) comprises a laminar, semi-laminar or turbulent flow for deployment as the particle cloud screen for imaging.

Fans (59 and 60) draw ambient air, or expelled air from the heat exchanger, through vents (61 and 88), comprising baffles, or vents, to produce a laminar protective air microenvironment (62, 63) enveloping cloud screen (58). For laminar particle cloud screen (58), this microenvironment improves boundary layer performance by decreasing boundary layer friction and improving the laminar quality of screen (58) for imaging.

It is important to note that in the prior art, a "Reynolds Number" was the determining factor for image quality and maximum size, but because this invention integrates multi-source projection, the reliance on laminar quality is diminished. A "Reynolds Number" (R) determines whether the stream is laminar or not. Viscosity is (u), velocity (V), density (ρ) and thickness of the stream (D) determine the transition point between laminar and turbulent flow, which was the limiting factor in the prior art. Furthermore, the EMC continuously modifies the microenvironment and particle cloud ejection velocity to compensate for a change in particle cloud density in order to minimize the visibility of the cloud. The change in particle cloud density affects directly the viscosity of the cloud and therefore the ejection velocities must change accordingly to maximize the laminar flow.

$$R = \frac{\rho V D}{\mu} \text{ (prior art)}$$

The ejected particle cloud continues on trajectory (64) along a straight path producing the particle cloud surface or volume for imaging and eventually disperses at (85) and is not used for imaging purposes. Particulates of screen at (58) return to device (84) to create a continuous loop system. The particle cloud moisture laded air returns back into device (84) not impacting the moisture level in the room where the device is operating. The density of the cloud is continuously monitored for its invisibility by onboard environmental diagnostics management control EMC (66), which monitors ambient parameters including but not limited to, humidity, temperature and ambient luminosity, which factors are collected by a plurality of sensors (65). Sensors (65) can comprise for example, a photodiode or photo-sensor, temperature, barometric as well as other climactic sensors to collect data. Sensor information is interpreted by diagnostics management control (66), which adjusts the density of screen (58) by optimizing the intensity of particle cloud manufacturing at (53), and the luminosity of projection from source (69) with respect to ambient humidity and ambient luminosity to control invisibility of the cloud screen (58). A photo-emitter placed on one side of the particle cloud and photo-detector on the opposite side, can be employed to calculate the visibility of the cloud by monitoring the amount of light passing from emitter to detector thereby maximizing the invisibility of the cloud.

Images stored on an internal image or data storage device such as CD, programmable memory, CD, DVD, computer (67), or external computer, including ancillary external video-sources such as TV, DVD, or videogame (68), produce the raw image data that is formed on an image generating means (70). Image generating means (70) may include an LCD display, acousto-optical scanner, rotating mirror assembly, laser scanner, or DLP micromirror to produce and direct an image through optical focusing assembly (71).

Illumination source (69), within an electromagnetic spectrum, such as a halogen bulb, xenon-arc lamp, UV or IR lamp or LED's, directs a beam of emissive energy consisting of a mono or polychromatic, coherent, non-coherent, visible or invisible illumination, ultimately towards cloud screen (58). The illumination means can also comprise coherent as well as polychromatic light sources. In a substitute embodiment the illumination source consists of high intensity LED's or an RGB white light laser or single coherent source, where image-generating means (70) operates above or below the visible spectrum. Light directed from illumination source (69) towards an image generating means (70), passes through focusing optics (71), producing light rays (76) directed to an external location as a "phantom" delivery source location (77). Phantom source (77) may employ one or more optical elements including a mirror or prism (83) to redirect or steer the projection (79, 80) towards particle cloud (58).

Collimating optics such as a parabolic mirror, lenses, prisms or other optical elements may be employed at anamorphic correction optics (77 or 78) for compensating projection for off-axis keystoning in one or more axis. Furthermore, electronic keystone correction may be employed to control generator (71). Anamorphic correction optics (78) may also include beam-splitting means for directing the light source passing through the image generator to various sources such as source (77) positioned at a location around the perimeter of cloud (58) and collimate the beam until reaching source (77). Beam splitting can employ plate, cube beam-splitters or rotating scanning mirrors with electronic shutters or optical choppers dividing the original source projection into a plurality of projections. Projection beams (76) are steered towards a single or plurality of phantom sources or locations surrounding cloud (58) redirecting light rays (79, 80) onto said cloud (58) for imaging. Imaging light rays (81, 82) traveling beyond particle cloud (58) continue to falloff and, caused by the limited depth of field range of optics (71, 78, 83) thereby appear out of focus.

The detection system comprises illumination source (72), directing illumination beam (130) producing a single (131) or dual stripe plane of light (131, 132), in which an intrusion is captured by optical sensor (86) contained in the cone of vision of the sensor image boundary (133, 134) of cloud screen (58). Similarly, two separate sources may be employed to generate two separate planes or the device may operate utilizing exclusively one plane of light. When foreign object intrusion penetrates the planar light source (131, 132) parallel to the image, this illumination reflects off the intrusion and is captured by optical sensor (86). Detected information is sent via signal (135) to computer (67) running current software or operating system (OS) to update the image generator (70) according to the input information. The device may also include user audio feedback for recognizing the selection or interaction with the non-solid image thereby providing the necessary user haptic feedback.

In the preferred embodiment of the invention the detection system utilizes optical, machine vision means to capture physical intrusion within the detectable perimeter of the image, but may employ other detection methods. These include for example acoustic based detection methods such as ultrasonic detectors, illumination based methods such as IR detectors, to locate and position physical objects, such as a hand or finger, for real-time tracking purposes. The area in which the image is being composed is monitored for any foreign physical intrusion such as a finger, hand, pen or other physical object such as a surgical knife. The detectable space corresponds directly to an overlaid area of the image, allowing the image coupled with the detection system to serve as an I/O interface that can be manipulated through the use of a computer. To diminish external detection interference in its preferred embodiment, the detection system relies on an optical detector (86), operating at a narrow band within the invisible spectrum, minimizing captured ambient background light illuminating undesired background objects that are not related to the user input. The operating detection system wavelength furthermore, does not interfere with the imaging and remains unnoticed by the user. The preferred embodiment utilizes a narrow bandwidth illumination source (72), beyond the visible spectrum, such as infrared (IR) or near-infrared (NIR) illumination and subsequentially composed into a beam by collimating the illumination. The beam generated by a illumination source (72), is sent to one or a plurality of line generating means such as employing a line generating cylindrical lens or rotating mirror means to produce a single or dual illuminated plane of light (73, 74) coexisting spatially parallel to or on top of the image on cloud (58). This interactive process is described more clearly below.

Figure 9A:
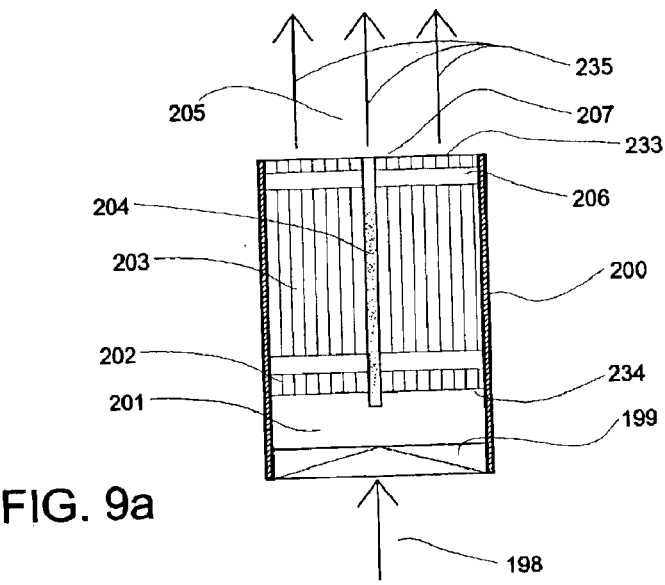
FIG. 9a is close-up of baffle venting for generating microenvironment of the invention.
Figure 9B:
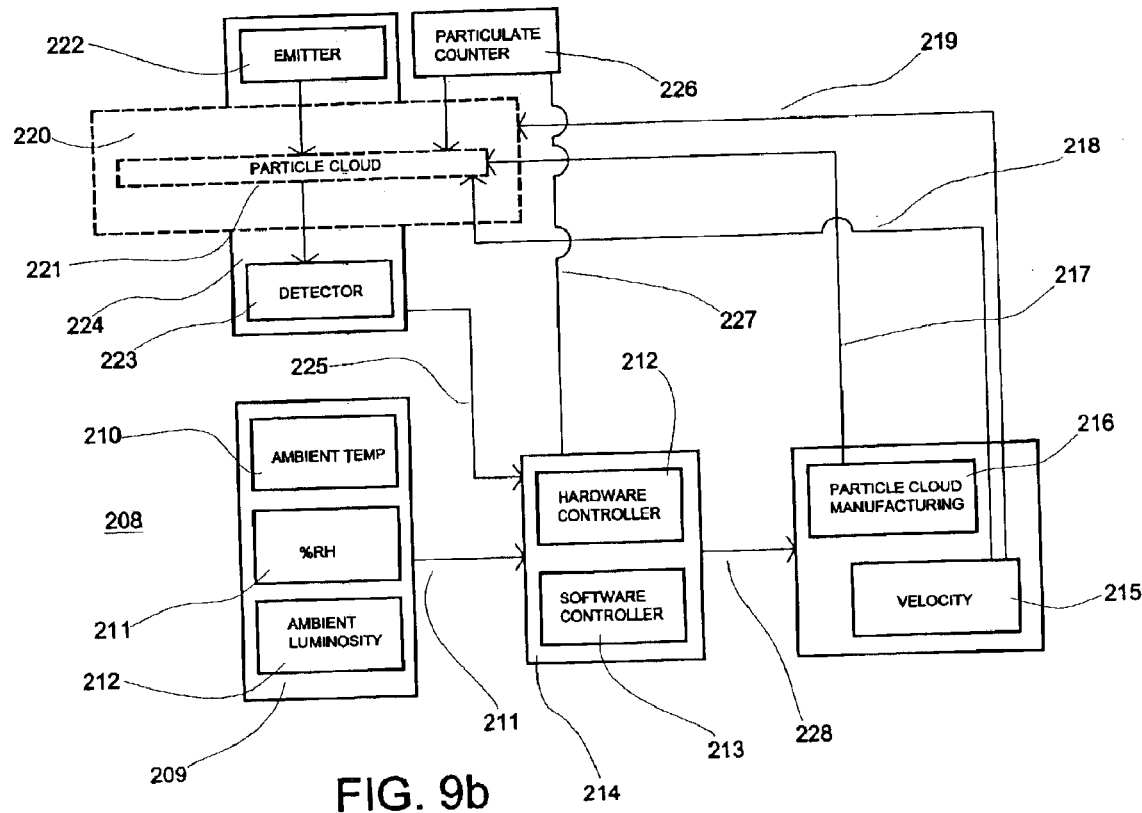
FIG. 9b is a schematic of the environmental management control process.
Figure 10:
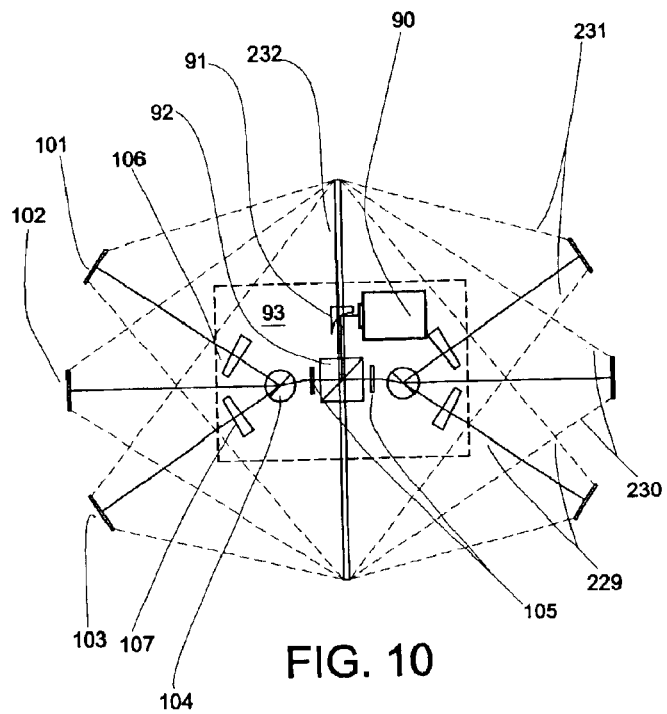
FIG. 10 illustrates a plan view of multisource projection.
Figure 11:
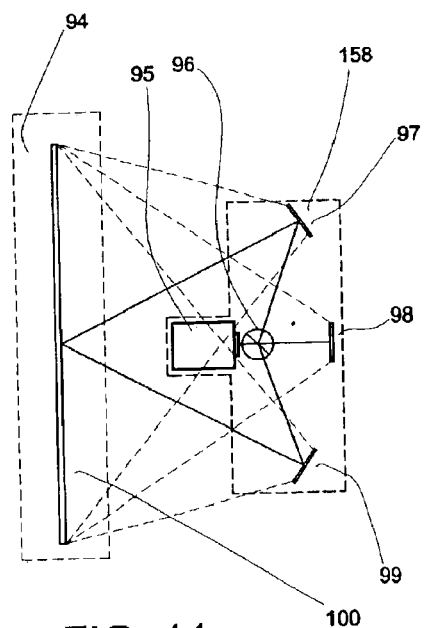
FIG. 11 is an alternate plan view of a single side remote multisource projection.
Figure 12:
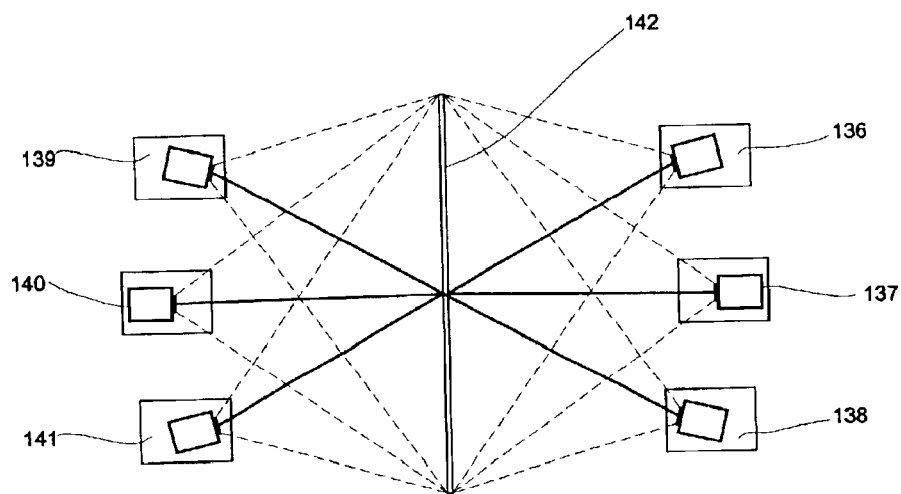
FIG. 12 is an alternate plan view of a dual side individual multisource projection.
Figure 13:
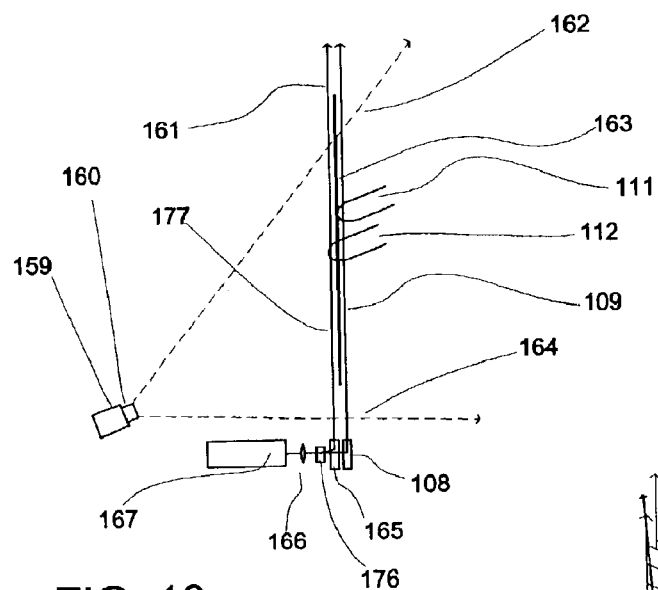
FIG. 13 illustrates a side view of the detection system of FIG. 9.
Figure 14:
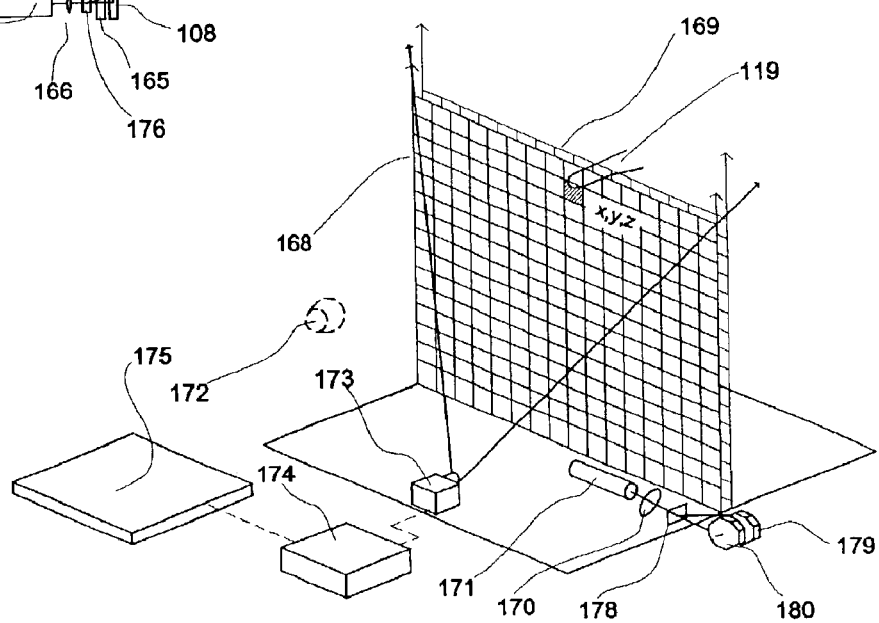
FIG. 14 is an axonometric view of the detection system of FIG. 13.
Figure 15:
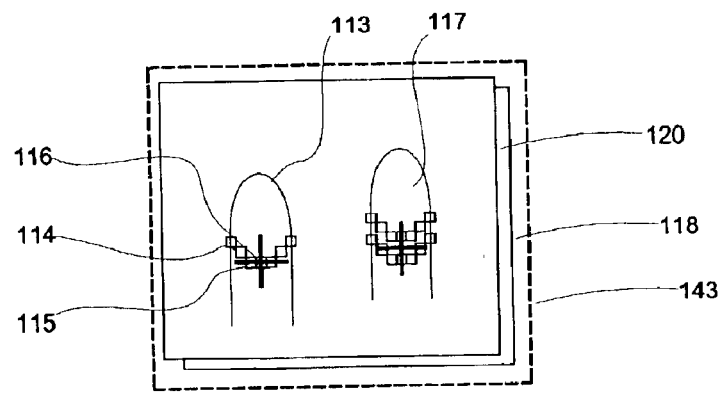
FIG. 15 illustrates an example of a captured image from the detection system; single click (translation), and double click (selection).

FIG. 9a describes the microenvironment generation process in order to deliver a high degree of uniformity to the laminar airflow stream protecting the cloud, thereby improving image quality dramatically over existing protective air curtains. A multistage venting or baffling arrangement of one or more chambers or baffles, vents or meshes, of varying sizes and shapes, diminishes micro-variant changes in temperature and velocity between the microenvironment and cloud, thereby minimizing friction and cloud breakdown, thereby improving image quality drastically over existing art. The surrounding ambient air or exhausted air (198) from the heat exchanger passes through means to move this air, such as by an axial, tangential fan or blower (199) housed within an enclosure (200) with sidewalls. Air is mixed into a first-stage equalizing chamber (201) to balance air speed and direction within air space (202) in enclosure (200). Subsequently the air passes through a linear parallel baffle or vent (203), of length and cell diameter size determined by the Reynolds equation, to produce a laminar airflow in which the ejection orifice end (233), and injection orifice end (234) are colinear with the laminar airflow microenvironment (235). Simultaneously, the particle cloud laminar ejection, thin walled nozzle (204) ejects particle cloud material towards the exterior (205) into the laminar airflow microenvironment (235). Since there are invariably subtle differences in temperature and velocity between the cloud and microenvironment, the two airflows pass through a final equalization chamber (206) to further stabilize, before being ejected into the air (205). Further equalization can be achieved by offsetting baffles, so that adjacent cells share airflow, minimizing airflow velocity gradients. Exterior ejection baffle or vents (207) are thin in thickness and depth in order to prevent condensate buildup, allowing for extended use.

FIG. 9*b* illustrates the main processes involved in maintaining a high fidelity image suspended in free-space, by minimizing cloud visibility and reducing fluttering due to particle cloud turbulence. Environmental sensors (209) monitor surrounding air (208). Sensors include, but are not limited to ambient temperature sensors (210), such as solid-state thermo-resistors, to gauge temperatures. Similarly, relative humidity sensor (211) and ambient luminosity sensor (212), such as a photo-detector gather additional data (211), such as binary, resistive, voltage or current values. Data (211) is sent to controller (214) comprising of electronic hardware circuitry to gather the separate sensor value information to create a composite sum value corresponding to the amount of absolute or relative change as signal (228) for future use in modifying parameters of the particle cloud.

Signal (228) attenuates particle cloud manufacturing density (216) by controlling the amount of particulates generated by regulating the supply voltage or current to the ultrasonic atomizer. Similarly, the signal (228) can vary the outlet opening of particulates escaping the expansion chamber thereby controlling the amount of particulates (217), ejected into the cloud (221). Since the amount of particulates ejected is directly proportional to the viscosity as defined in Reynolds Equation, modifying the particulate density (the amount of material into the air) requires a proportional change in both particle cloud ejection velocity (218) and microenvironment ejection velocity (219). Signal (228) controls this ejection velocity by varying fan speed, such as by utilizing pulse width modulation to alter exit velocities of particle cloud (221) and microenvironment (220).

Augmenting these detectors, or operating as a separate unit, a cloud visibility detector (224) comprising an illumination source (222), such as a photo emitter or laser and corresponding photo detector (223), such as a Cadmium sulfide photocell. Both detector (223) and illumination source (222), each disposed at opposite ends of the particle cloud are arranged so as to gather a known quantity of light from the illumination source (222) passing through the particle cloud (221) which is received by the opposite detector. The loss in signal strength to the light reflected off particle cloud (221) and not received by detector (223) corresponds to the density and therefore visibility of the cloud. This signal (225) can be sent to controller (214) to regulate density and velocity modifying visibility of cloud (221). Similarly, another method includes, an airborne particulate counter (226) to acquire particulate air sample data within the particle cloud (221) to determine the particle count corresponding to the density or visibility of particle cloud (221). Particulate data (227) is sent to controller (214), instructing (228), to adjust particle cloud manufacturing (216) and exit velocities (215) in the same way as the previously described methods.

FIG. 10 shows the top view of the multi-source embodiment of the invention where the main projection (90) and optics (91, 92, 104, 105, 106, 107) are part of the main unit (93). Image projection originates from imaging generator (90) consisting of a high frame rate projector, Liquid Crystal Display (LCD), Digital Light Processing (DLP) unit, or other aforementioned methods, directed towards collimating optics (91) towards beam splitting mechanism (92). In a solid-state embodiment, these optical elements comprise a series of prisms, and, or beam splitters to gradually divide the original beam into numerous beams, well understood in the art. In the case of an infinite number of beam splitting capabilities, the original beam is directed towards a single or multi-faceted rotating scanner (104) redirecting the beam towards a plurality of sources such as (101, 102, 103). A photo interrupter (105), such as an optical chopper or electronic shutter, is necessary to create consecutive image segments, in a fashion similar to a conventional reel-to-reel movie projector moving through its frames. Further anamorphic optical assemblies (106, 107) correct for off-axis projection, either as part of the main imaging unit (93) or at individual sources (101, 102, 103). The anamorphic optics and keystone correction in all embodiments insure that the projection beams (229, 230, 231) directed at, and illuminating particle cloud (232) used in a identical projection scenario, each project and focus the same image from each source are focused at the same location on particle cloud (232).

FIG. 11 shows a top view of another multi-source embodiment where the projection and optics (158) are separated from the main unit (94). Imaging source (95) directs light to beam re-directing means (96). Beam re-directing means (96) comprises a method to steer or reflect incoming projection from imaging unit (95) and may consist of cube beam splitters, plate beam splitters, mirrors, wedge prisms or scanning mirrors. The projection is sent to phantom sources (97, 98, 99) where the image is composed onto cloud (100). FIG. 12 demonstrates a third embodiment where each projection source (136, 137, 138, 139, 140, 141) is a separate unit projecting onto cloud (142). In another variation, fiber optics can be employed to transfer image projection to each source.

The detection system is isolated for clearer explanation in FIGS. 13 through 15. In the preferred embodiment of the invention, FIG. 13 shows the isolated detection system shown in FIG. 9 and means to capture user input, using an optical detector, sensor or camera such as CCD or CMOS detector (159), using lens or bandwidth filters (160). Capture means (159) captures solely reflected illumination within the image boundary within defined image range (162, 164), of particle cloud (163).

An illumination source (167), with a spectral output similar to the frequency response of the detector, such as an IR laser projecting a beam through a line generator and collimator (166), reflect off beam splitter (176) towards mirror (165) and mirror (108), into two separate IR light planes (109 and 177). Line generating techniques, well known in the art to create a plane of light, such as those employing rotating mirrors or cylindrical lenses, such as Ohmori's U.S. Pat. No. 5,012,485 can be employed are employed at (108, 165). Finger (111) intersects with beam (109) reflecting light back to detector (159) for real-time capture. Similarly, finger (112) intersecting both beams (109 and 177), reflects two separate highlights captured by detector (159). In another embodiment each detectable light plane functions at a different wavelength. Similarly, the invention can operate using a single detectable light plane and utilize dwell software, well-known in the art, or create a selection by penetrating the plane twice in rapid succession to "double click", as in a computer OS.

FIG. 14 shows an axonometric view of FIG. 13. Illumination sources such as a laser diode (171) direct light towards collimator (170), passing through a means to split the beam, such as a beamsplitter (178). Similarly, the illumination source can comprise projection source illumination (172) or collimated IR LED's parallel to the particle cloud. Split beams directed to plane generating means, such as rotating mirrors (179, 180) create double detection beam planes (168, 169). Finger (119) intersects parallel detection beam planes (79 and 80), centered at location x, y, z in three-dimensional space. Detector (173) captures the highlighted intersection either as a two-axis coordinates, or by combining two separate detectors or sensors provides a third axis for tracking positional information. This information is sent to controller (174) and is interpreted by a processor or computer CPU (175) using an operating system or software. Blob recognition software, coupled with mouse emulation driven software well known in the art, translates the captured pixels as addressable coordinates within a desktop environment or application, to allow the user to navigate freely using a finger or stylus. Software such as those designed by NaturalPoint, Xvision, Smoothware Design may be employed to interpret the captured data to operate the software driven interface in a mouse style environment. Similarly, gesture recognition or voice recognition means can be employed to augment the input interface.

FIG. 15 is an example of a user input light reflection captured by the detection system when finger (113) intersects at (114) first detection beam (118). The illumination reflects off finger (113) and is captured by optical sensor (143) stimulating corresponding pixels of optical sensor (143) represented as (115). The center of the crescent pixels (115) corresponds to a user input at point (116), which representing the x and y coordinates. In a similar fashion, when finger (117) intersects both detection beams (118, 120), the highlighted double crescent is captured by the detector. Moving the user's finger on the surface of the image, thereby skimming the image surface, allows the user to navigate using a finger as a virtual touch-screen interface. When the user requires selecting, the equivalent of double clicking on a typical OS, the intrusion or finger must proceed further into the image as if selecting it, similar to pushing a button.

While a description of the preferred embodiment of the present invention has been given, further modifications and alterations will occur to those skilled in the art. It is therefore understood that all such modifications and alterations be considered as within the spirit and scope of the invention as defined by the appended claims.

I claim:

1. A system for creating a free-space display comprising a heat pump, means to introduce ambient air through the heat pump, means to create a thermal differential in the heat pump, means to extract condensate from the ambient air using the thermal differential, means to pass the condensate into an expansion chamber, means to atomize the condensate in the expansion chamber to create particle cloud material, ejection nozzle means to eject the particle cloud material into the air to create a particle cloud screen, means to eject a parallel laminar air stream enclosing the particle cloud, means to generate an image or images, projection means to project an image or images onto the particle cloud screen.

2. A system for creating a free-space display comprising a heat pump, means to introduce ambient air through the heat pump, means to create a thermal differential in the heat pump, means to extract condensate from the ambient air using the thermal differential, means to pass the condensate into an expansion chamber, means to atomize the condensate in the expansion chamber to create particle cloud material, ejection nozzle means to eject the particle cloud material into the air to create a particle cloud screen, means to eject a parallel laminar air stream enclosing the particle cloud, means to generate an image or images, projection means to project an image or images onto the particle cloud screen, detection means located adjacent to the particle cloud screen and adapted to capture intrusion within or adjacent to the projected image, means to read the location of each intrusion, means to send the intrusion location information to a controller, means to modify the image generator means in response to the intrusion location information.

3. The system of claim 1 or 2 in which the heat pump comprises a compressor based reverse-cycle cooling dehumidification system.

4. The system of claim 1 or 2 in which the heat pump comprises a thermoelectric Peltier-junction based system.

5. The system of claim 1 or 2 in which heat pump comprises a fuel cell or means to use cooled gases or liquids.

6. The system of claim 1 or 2 further comprising a holding vessel for collection of the condensate.

7. The system of claim 1 or 2, further comprising means to atomize the condensate into a microscopic particle cloud of individual particulates with a mean diameter of 1 to 10 microns.

8. The system of claim 1 or 2, further comprising means to atomize the condensate into a microscopic particle cloud of individual particulates with a mean diameter greater than 10 microns.

9. The system of claim 1 or 2, in which the atomization means comprises electro-mechanical or ultrasonic means.

10. The system of claim 1 or 2 further comprising fluorescence tracers or dyes in the particle cloud.

11. The system of claim 1 or 2, further comprising a co-linear ejection nozzle to eject the particles into the air to create a co-linear ejected particle cloud.

12. The system of claim 11 comprising an ejection nozzle of a geometry corresponding to the depth and width of the particle cloud screen, where the third dimension is the extruded particle cloud ejection distance.

13. The system of claim 1 or 2, in which the ejected particles generate a laminar, semi-laminar or turbulent particle cloud.

14. The system of claim 1 or 2, in which the particle cloud comprises an invisible, near invisible or visible particle cloud.

15. The system of claim 1 or 2, in which the particle cloud comprises a medium to reflect, refract and transmit light or images from a projection source directed at said particle cloud.

16. The system of claim 1 or 2, in which the particle cloud comprises a medium with a higher transmissive illumination coefficient than a reflective and refractive illumination coefficient.

17. The system of claim 1 or 2 in which the means to create the laminar airflow comprises parallel linear baffles, vents, meshes or a combination thereof with fans or blowers disposed at the opposite orifice end of the laminar airflow.

18. The system of claim 17 in which the means to create the laminar airflow comprises a series of stacked parallel, linear baffles, vents, or meshes with the fan or blower at one orifice end, and laminar airflow at the other orifice end.

19. The system of claim 18 further comprising a single air space or plurality of air spaces between the baffles, vents, or meshes, to create a velocity equalization chamber.

20. The system of claim 1 or 2 further comprising means to monitor the visibility of the particle cloud screen.

21. The system of claim 20 further comprising light emitting means and light detecting means directed towards each other, with the particle cloud between the light emitting means and light detecting means to measure the light transmissivity and reflectivity of the particle cloud screen.

22. The system of claim 21 in which the light emitting means comprises a light emitting diode or laser and the light detecting means comprises a photo-detector.

23. The system of claim 20 further comprising an ambient particulate counter to monitor the particulate count of the particle cloud screen.

24. The system of claim 20 further comprising means to monitor the ambient humidity, ambient temperature and ambient luminosity.

25. The system of claim 20 in which responsive to the monitored data environmental management control means regulates the ejection velocity of the particle cloud material, the particle cloud manufacturing intensity, or a combination thereof to maximize particle cloud invisibility.

26. The system of claim 25 in which the environmental management control means regulates ejection velocity by utilizing fan speed control means.

27. The system of claim 1 or 2 in which the image generating means creates a still or video image.

28. The system of claim 27 further comprising utilizing polarized, random, coherent, visible or invisible wavelengths of light combined with the image generating means to create an image projector.

29. The system of claim 27 in which said image-generating means comprises a liquid crystal display, digital light processing panel, organic light emitting diode, optical modulation or a laser scanner.

30. The system of claim 1 or 2 comprising a single projector means directed and aligned towards the particle cloud screen for imaging.

31. The system of claim 1 or 2 comprising a plurality of projectors directed towards the particle cloud screen for imaging.

32. The system of claim 1 or 2 further comprising a single projector or plurality of projectors which comprise optical or electronic anamorphic keystone imaging distortion correction for one or more axis.

33. The system of claim 1 or 2 further comprising optical means to collimate a projection beam towards a phantom source, said optical means comprising beam steering or reflecting means surrounding the particle cloud, that redirect the projection beam onto said particle cloud.

34. The system of claim 1 or 2 further comprising a single projector or plurality of projectors which comprise optical or electronic anamorphic keystone focal distance correction for one or more axis.

35. The system of claim 1 or 2 comprising a single projection means, means to direct a projection beam towards a single or plurality of phantom sources, said means to direct the projection beam comprising beam steering or reflecting means surrounding the particle cloud that redirect the beam towards said particle cloud.

36. The system of claim 35 comprising multiple projection beam-splitting, beam-steering, beam-beam chopping or a combination thereof to divide the projection image into a plurality of projection beams.

37. The system of claim 36 further comprising beam splitters, polka dot splitters, band-pass filters, wedge prisms, prisms, static mirrors, rotating mirrors, digital light processing, electronic or physical shutters, optical choppers, or a combination thereof to split the projection beam into a plurality of beams aimed towards a plurality of phantom redirecting sources surrounding the particle cloud.

38. The system of claim 1 or 2 comprising means to project identical images or discrete images from discrete or identical sources towards the particle cloud to compose similar or discrete images on said particle cloud.

39. The system of claim 2 further comprising a visible or invisible illumination source directed at the particle cloud region for user input tracking.

40. The system of claim 39, in which the illumination source comprises a halogen lamp, incandescent lamp, light emitting diode or laser.

41. The system of claim 40 in which the illumination source produces light in the infrared or near infrared spectrum.

42. The system of claim 2 in which the means to detect physical intrusion within the particle cloud comprises machine vision, optical capturing means comprising optical detectors and sensors, video cameras, complementary metal-oxide silicon sensors, or charged coupled devices.

43. The system of claim 42 further comprising a band-pass filter.

44. The system of claim 39 comprising a single illumination detection plane.

45. The system of claim 39 further comprising a plurality of illumination detection planes.

46. The system of claim 44 or 45 further comprising cylindrical lenses, collimating lenses, rotating faceted mirrors, or a combination thereof, to compose a single or plurality of detection planes.

47. The system of claim 2 comprising a plurality of detectors to track user input intrusion within the particle cloud in two or three-dimensional space.

48. The system of claim 42 further comprising means to communicate illuminated, detected positional data to a controller, processor or computer.

49. The system of claim 42 further comprising motion-tracking software to interpret illuminated, detected positional data to navigate within software application environments or graphic user environments.

50. The system of claim 49 in which the tracking software comprises blob recognition, crescent recognition or gesture recognition software.

51. The system of claim 49 further comprising noise filtering software.

52. The system of claim 49 further comprising navigation utilizing mouse emulation software.

53. The system of claim 49 comprising means to modify the projection generating means in response to the illuminated detection positional data registered by the detector, coupled with tracking software running mouse emulation software or navigation software to direct the operating system or software application controlling the projection software.

54. The system of claim 2 comprising a computer running tracking software projector content, for controlling the image projectors.

55. The system of claim 1 or 2 further comprising an aspirator disposed at the end of the particle cloud trajectory, to collect condensate and means to transfer the condensate to the expansion chamber for particle cloud manufacturing.

56. The system of claim 55 further comprising a heat pump with the aspirator.

57. A method for creating a free-space display comprising dehumidifying air, capturing the humidity, atomizing the humidity to create particle cloud material one to ten microns in diameter, ejecting the particle cloud material to create a particle cloud, surrounding the particle cloud with a parallel laminar air stream microenvironment of equal or similar velocity and trajectory to the particle cloud, generating an image or images, projecting the image or images onto the particle cloud.

58. A method for creating an interactive free-space display comprising dehumidifying air, capturing the humidity, atomizing the humidity to create particle cloud material one to ten microns in diameter, ejecting the particle cloud material to create a particle cloud, surrounding the particle cloud with a parallel laminar air stream microenvironment of equal or similar velocity and trajectory to the particle cloud, generating an image or images, projecting the image or images onto the particle cloud, detecting an intrusion within or adjacent to the free-space display by detecting said intrusion to create trackable data and using the trackable data to computationally update the projection of the image.

59. The method of claim 57 or 58 further comprising splitting the projected image or images into a plurality of projection beams, redirecting the plurality of projection beams and focusing said projection beams onto the particle cloud to create a free-space image.

60. A method for creating an interactive free-space display comprising dehumidifying air, capturing the humidity and ejecting it to re-humidify the air to create a surface or volume particle cloud comprising individual one to ten micron mean diameter particulates, surrounding the particle cloud with a microenvironment of equal or similar velocity, illuminating said cloud using an illumination source, passing the illumination onto, reflecting or passing through an image generating means to split projected images into a plurality of projection beams, redirecting projection beams and focusing said projection image from projection means onto the particle cloud to reflect, refract, and transmit light to generate a free-space image, detecting the intrusion of a physical object within or adjacent to the free-space image by video capture means by illuminating said intrusion and detecting said illumination in order to create trackable data and using the trackable data as input to computationally update the projection means.

61. The method of claim 57 or 58 comprising generating a differential temperature drop of 10 degrees or more Celsius between the heat pump and ambient air to extract condensate from the ambient air.

62. The method of claim 57 or 58, further comprising ejecting a laminar airflow microenvironment surrounding one or more parallel sides of said particle cloud screen to enhance boundary layer performance between the particle cloud screen and ambient air.

63. The method of claim 62 in which the laminar airflow microenvironment velocity and trajectory is the same or similar in velocity and trajectory to that of the particle cloud.

64. The method of claim 60, in which the detection illumination coexists spatially and parallel to the particle cloud image region.

65. A system for creating a free-space display comprising a compressor-based condensing system to extract condensate from air, a holding vessel for collecting the condensate, an opening in the holding vessel for introduction of additional liquid, an atomizer to generate a particle cloud of condensate in an expansion chamber, an ejection nozzle connected to the expansion chamber to eject the particle cloud into the air, fans connected to the expansion chamber to move the particle cloud into the air, baffles or vents parallel to and spaced from the ejection nozzle, fans disposed adjacent to the baffles or vents to blow air through the baffles or vents, enclosing the particle cloud with parallel airstreams, light emitters and light detectors directed towards each other with the particle cloud in between to monitor the visibility of the particle cloud, a system for controlling the quantity of ejected particle cloud based upon the monitoring of the visibility of the particle cloud, an image projector directed towards and illuminating the particle cloud, to generate an image upon the particle cloud.

66. A system for creating a free-space display comprising a thermo-electric condensing system to extract condensate from air, a holding vessel for collecting the condensate, an opening in the holding vessel for introduction of additional liquid, an atomizer to generate a particle cloud of condensate in an expansion chamber, an ejection nozzle connected to the expansion chamber to eject the particle cloud into the air, fans connected to the expansion chamber to move the cloud into the air, baffles or vents parallel to and spaced from the ejection nozzle, fans disposed adjacent to the baffles or vents to blow air through the baffles or vents, enclosing the particle cloud with parallel airatreams, light emitters and light detectors directed towards each other with the particle cloud in between to monitor the visibility of the particle cloud, a system for controlling the quantity of ejected particle cloud based on the monitoring of the visibility of the particle cloud, an image projector directed towards and illuminating the particle cloud, to generate an image upon the particle cloud.

67. A system for creating an interactive free-space display comprising a compressor-based condensing system to extract condensate from air, a holding vessel for collecting the condensate, an opening in the holding vessel for introduction of additional liquid, an atomizer to generate a particle cloud of condensate in an expansion chamber, an ejection nozzle connected to the expansion chamber to eject the particle cloud into the air, fans connected to the expansion chamber to move the particle cloud into the air, baffles or vents parallel to and spaced from the ejection nozzle, fans adjacent to the baffles or vents to blow air through the baffles or vents, enclosing the particle cloud with parallel arstreams, light emitters and light detectors directed towards each other with the particle cloud in between to monitor the visibility of the particle cloud, a system for controlling the quantity of ejected particle cloud based upon the monitoring of the visibility of the particle cloud, an image projector directed towards and illuminating the particle cloud, light emitters to create one or more planes of light parallel to or coplanar with the particle cloud, optical sensors to detect physical intrusion within the planes of light, position-tracking software to track physical intrusion in the planes of light for controlling the image projection within a graphic user environment.

68. A system for creating an interactive free-space display comprising a thermo-electric condensing system to extract condensate from air, a holding vessel for collecting the condensate, an opening in the holding vessel for introduction of additional liquid, an atomizer to generate a particle cloud of condensate in an expansion chamber, an ejection nozzle connected to the expansion chamber to eject the particle cloud into the air, fans connected to the expansion chamber to move the particle cloud into the air, baffles or vents parallel to and spaced from the ejection nozzle, fans disposed adjacent to the baffles or vents to blow air through the baffles or vents, enclosing the particle cloud with parallel airstreams, light emitters and light detectors directed towards each other with the particle cloud in between to monitor the visibility of the particle cloud, a system for controlling the quantity of ejected particle cloud based upon the monitoring of the visibility of the particle cloud, an image projector directed towards and illuminating the particle cloud, light emitters to create one or more planes of light parallel to or coplanar with the particle cloud, optical sensors to detect physical intrusion within the planes of light, position-tracking software to track physical intrusion in the planes of light for controlling the image projection within a graphic user environment.

69. A system for creating a free-space display comprising a compressor-based condensing system to extract condensate from air, a holding vessel for collecting the condensate, an opening in the holding vessel for introduction of additional liquid, an atomizer to generate a particle cloud of condensate in an expansion chamber, an ejection nozzle connected to the expansion chamber to eject the particle cloud into the air, fans connected to the expansion chamber to move the particle cloud into the air, baffles or vents parallel to and spaced from the ejection nozzle, fans disposed adjacent to the baffles or vents to blow air through the baffles or vents, enclosing the particle cloud with parallel airstreams, light emitters and light detectors directed towards each other with the particle cloud in between to monitor the visibility of the particle cloud, a system for controlling the quantity of ejected particle cloud based upon the monitoring of the visibility of the particle cloud, an image projector directed towards a plurality of mirrors to split and redirect the projected image towards locations surrounding the particle cloud and focus the projected image onto the particle cloud.

70. A system for creating free-space display comprising a thermo-electric condensing system to extract condensate from air, a holding vessel for collecting the condensate, an opening in the holding vessel for introduction of additional liquid, an atomizer to generate a particle cloud of condensate in an expansion chamber, an ejection nozzle connected to the expansion chamber to eject the particle cloud into the air, fans connected to the expansion chamber to move the cloud into the air, baffles or vents parallel to and spaced from the ejection nozzle, fans disposed adjacent to the baffles or vents to blow air through the baffles or vents, enclosing the particle cloud with parallel airstreams, light emitters and light detecors directed towards each other with the particle cloud in between to monitor the visibility of the particle cloud, a system for controlling the quantity of ejected particle cloud based on the monitoring of the visibility of the particle cloud, an image projector directed towards a plurality of mirrors to split and redirect the projected image towards locations surrounding the particle cloud and focus the projected image onto the particle cloud.

71. A system for creating free-space display comprising a compressor-based condensing system to extract condensate from air, a holding vessel for collecting the condensate, an opening in the holding vessel for introduction of additional liquid, an atomizer to generate a particle cloud of condensate in an expansion chamber, an ejection nozzle connected to the expansion chamber to eject the particle cloud into the air, fans connected to the expansion chamber to move the particle cloud into the air, battles or vents parallel to and spaced from the ejection nozzle, fans disposed adjacent to the baffles or vents to blow air through the baffles or vents, enclosing the particle cloud with parallel airstreams, light emitters and light detectors directed towards each other with the particle cloud in between to monitor the visibility of the particle cloud, a system for controlling the quantity of ejected particle cloud based upon the monitoring of the visibility of the particle cloud, an image projector directed towards a plurality of mirrors to split and redirect the projected image towards locations surrounding the particle cloud and focus the projected image onto the particle cloud, light emitters to create one or more planes of light parallel to or coplanar with the particle cloud, optical sensors to detect physical intrusion within the plane of light, position-tracking software to track physical intrusion into the plane of light for controlling the image projection within a graphic user environment.

72. A system for creating a free-space display comprising a thermo-electric condensing system to extract condensate from air, a holding vessel for collecting the condensate, an opening in the holding vessel for introduction of additional liquid, an atomizer to generate a particle cloud of condensate in an expansion chamber, an expansion chamber, an ejection nozzle connected to the expansion chamber to eject the particle cloud into the air, fans connected to the expansion chamber to move the cloud into the air, baffles or vents parallel to and spaced from the ejection nozzle, fans disposed adjacent to the baffles or vents to blow air through the baffles or vents, enclosing the particle cloud with parallel airstreams, light emitters and light detectors directed towards each other with the particle cloud in between them to monitor the visibility of the particle cloud, a control system for the atomizer to control particle cloud conditions based on the monitoring of the visibility of the particle cloud, an image projector directed towards a plurality of mirrors to split and redirect the projected image towards locations surrounding the particle cloud and focus the projected image onto the particle cloud, light emitters to create one or more planes of light parallel to or coplanar with the particle cloud, optical sensors to detect physical intrusion within the plane of light, position-tracking software to track physical intrusion in the plane of light for controlling the image projection within a graphic user environment.

73. A method for creating a free-space display comprising condensing moisture from air and ejecting the moisture into the air to generate a particle cloud and projecting images onto the particle cloud.

74. A method for creating a free-space display comprising condensing moisture from air and ejecting the moisture into the air to generate a particle cloud and projecting images onto the particle cloud from a plurality of sources surrounding the particle cloud.

75. A method for creating an interactive free-space display comprising condensing moisture from air and ejecting the moisture into the air to generate a particle cloud and projecting images onto the particle cloud, and tracking the position of physical intrusion adjacent to or within the particle cloud for controlling the image projection within a graphic user environment.

76. A method for creating an interactive free-space display comprising condensing moisture from air and ejecting the moisture into the air to generate a particle cloud and projecting images onto the particle cloud from a plurality of sources surrounding the particle cloud, and tracking the position of physical intrusion adjacent to or within the particle cloud for controlling the image projection within a graphic user environment.

77. A method for creating a free-space display comprising condensing moisture from air and ejecting the moisture into the air to generate a particle cloud and projecting separate stereo images onto the particle cloud.

78. A method for creating an interactive free-space display comprising condensing moisture from air and ejecting the moisture into the air to generate a particle cloud and projecting separate stereo images onto the particle cloud, while tracking the position of physical intrusion adjacent to or within the particle cloud for controlling the image projection within a graphic user environment.

79. A method for creating a free-space display comprising condensing moisture from air and ejecting the moisture into the air to generate a particle cloud and projecting intersecting beams from a plurality of sources onto the particle cloud.

80. A method for creating a free-space display comprising condensing moisture from air and ejecting the moisture into the air to generate a particle cloud and projecting intersecting beams from a plurality of sources onto the particle cloud, while tracking the position of physical intrusion adjacent to or within the particle cloud for controlling the projection within a graphic user environment.

* * * * *